June 23, 1970    J. A. OELRICH ET AL    3,516,331

TIME MODULATED HYDRAULICALLY ACTUATED CONTROL MECHANISM

Filed March 21, 1967    4 Sheets-Sheet 1

INVENTORS
JOHN A. OELRICH
JOSEPH J. ANDERSEN
BY Radford W Luther
ATTORNEY

INVENTORS
JOHN A. OELRICH
JOSEPH J. ANDERSEN
BY Radford W Luther
ATTORNEY

United States Patent Office 3,516,331
Patented June 23, 1970

3,516,331
TIME MODULATED HYDRAULICALLY
ACTUATED CONTROL MECHANISM
John A. Oelrich, Granby, and Joseph J. Andersen, Bristol, Conn., assignors to Chandler Evans Inc., West Hartford, Conn., a corporation of Delaware
Filed Mar. 21, 1967, Ser. No. 624,902
Int. Cl. F15l 13/044, 15/17
U.S. Cl. 91—47                                10 Claims

ABSTRACT OF THE DISCLOSURE

Control apparatus having a time referenced electrical carrier signal combined with a variable analogue electrical input signal to produce a time modulated electrical output signal. A solenoid operated valve in which the solenoid receives the electrical output signal and positions the valve such that high pressure hydraulic fluid is intermittently transferred from its source and applied to an actuator piston in a fluctuating manner such that the output electrical signal is hydraulically converted into a substantially continuous steady state control force that positions a compliant load.

BACKGROUND OF THE INVENTION

This invention pertains to a control system that operates in response to a command input signal; and more particularly has reference to a control system in which a carrier signal in combination with an input signal produces a modulated input signal that is hydraulically converted into a force output signal; the magnitude of the force being proportional to the magnitude of the input signal over the complete range of input signal operation. The invention also concerns a control unit in which a time reference carrier signal is combined with a variable analogue electrical input signal to produce a time modulated electrical output signal that is hydraulically converted into a force signal having a substantially continuous steady-state force output when integrated with respect to time. This invention also concerns a control unit in which a varying analogue input signal and a symmetrical time reference signal are combined to produce a time modulated electrical output signal of low energy level that is converted and hydraulically amplified to a substantially non-fluctuating force output of high energy level with each finite magnitude of force proportional to a corresponding finite magnitude of input signal.

The invention will be described with specific reference to a missile guidance system; its utility in other applications, however, will be readily apparent. Many missiles use target tracking devices located in the missile proper as the means of supplying the guidance intelligence necessary to guide the missile to a preselected target. One common type of target tracking system well known in the art produces an electrical output signal that indicates the instantaneous angular rate of change of the line of sight of the tracking device with respect to the target. The tracking device provides an electrical output signal of relatively low energy level. This low energy electric signal is converted into a force capable of operating the missile steering device that is used in combination with the guidance device to steer the missile in response to the guidance electrical output command signal.

One well known method of providing the force necessary to directly move the steering control surfaces of a missile is by means of power amplifying actuators that convert a signal of low energy level into a large power signal sufficient to directly move the missile control surfaces. The conventional power amplifying system employs a servo-actuator organization utilizing a position proportional to input signal concept that is generally operated in a closed loop mode. This conventional system, when operated closed loop, produces as a function of the input command signal, a variable continuous position, the magnitude of which is independent of the control surface torque within the design limits of the power amplifying actuator device.

SUMMARY OF THE INVENTION

This invention pertains to an open loop servo-actuated hydraulically amplified system that can provide a substantially non-pulsating torque output that is proportional to a variable time modulated electrical analogue input signal over the complete range of input signal operation while simultaneously hydraulically amplifying the time modulated input signal to a substantially non-pulsating continuous force level sufficient to move the control surface. This mechanism produces a torque output that is independent of control surface position.

Accordingly, it is an object of the present invention to provide an improved force-balance control unit having the ability to receive a variable electrical input signal and combine said electrical input signal with a carrier signal to provide a time modulated signal that in cooperation with fluid transfer means converts said electrical input signal into a substantially continuous force output each increment of said force output being proportional to a corresponding increment of electrical input signal.

Another object of the invention is to provide a control unit in which a variable electrical input signal is combined with a carrier signal to provide a time modulated signal that controls an electrical switching circuit through which transfer valves control a hydraulic actuator to provide a substantially uninterrupted non-pulsating hydraulically amplified force output each value of said force output being proportional to a corresponding value of electrical input signal.

Still another object of this invention is to provide a control unit having a variable analogue electrical input command signal combined with a symmetrical electrical carrier signal to provide a time modulated electrical signal that is utilized to control hydraulic fluid transfer means to provide a substantially continuous non-pulsating hydraulic pressure to a hydraulic actuator such that said hydraulic actuator produces a force output each finite magnitude of which is proportional to a corresponding finite magnitude of electrical input signal.

A more specific object of the invention is to provide an open loop missile flight control having an electrical carrier signal wherein said carrier signal is combined with a variable electrical analogue input signal to provide a time modulated electrical signal wherein said time modulated output signal is utilized to control a hydraulic transfer valve to provide a hydraulic force to a hydraulically operated force amplifying actuator to provide an amplified substantially non-pulsating force output on a time integrated basis in which each incremental value of force output is proportional to a corresponding incremental value of electrical input signal.

Many other advantages and features of this invention will become manifest to those well versed in the art upon making reference to the description which follows.

DESCRIPTION OF THE DRAWINGS

The following is a brief description of the drawings accompanying the detailed description of the instant invention.

DESCRIPTION OF THE PREFERRED EMBODIMENTS

In general, the present invention is utilized in a class of guided missiles that have steering fins to guide the missile along a navigated flight path. These missiles utilize some form of guidance system to provide the necessary guidance intelligence that is communicated to the control system during the flight of the missile to permit the missile to be guided to the preselected target. The control unit utilizes the intelligence received from the guidance system to develop a torque that by means of fins steers the missile along a navigated flight path.

The control unit utilizes a servo-actuator system that applies the intelligence received from the guidance system to produce within the design limits of the particular actuator system a force output as a function of the guidance input signal that is independent of actuator position. The guidance unit by the interaction of the control unit and the steering fins produces a continuous torque that is applied to the missile as a steering torque, the magnitude of said torque in the case of a constant torque arm being proportional to the magnitude of the signal received from the guidance system. This input signal-steering torque proportionality relationship permits the torque balance principle to be applied to the design of missile guidance control systems. The torque balance principle, as applied to control units utilized in conjunction with the steering fins of guided missiles, is described in U.S. patent application No. 591,373 of inventor Jack O. Nash entitled "Control Mechanisms" filed on Oct. 18, 1966 and assigned to the same assignee as the instant application, to which reference may be had for a detailed explanation of the torque balance principle.

Time modulation of the control organization of the instant invention is achieved by pulse actuation of the control system hydraulic transfer valve elements such that the time integrated steady-state effect produces a pressure or pressure differential that is substantially continuous and non-pulsating and is proportional to the degree of modulation. The concept of time modulation is described in U.S. patent application entitled "Time Modulated Pneumatically Actuated Control Mechanism" of inventor John A. Oelrich, filed on even date herewith and assigned to the same assignee as the instant application, to which reference may be had for a detailed explanation of the principle of time modulation and the application of this principle to the operation of power amplifying control system actuators.

The instant hydraulic force amplifying time modulated control mechanism invention is an extension of the earlier work of inventor John A. Oelrich, in the field of pneumatics, described in detail in U.S. patent application entitled "Time Modulated Pneumatically Actuated Control Mechanism," filed on even date herewith. Despite the seeming similarities, pneumatic and hydraulic force amplifying principles, when applied to the time modulation concept, must be considered independently. The differences due to the much greater compressibility of gases as compared to liquids in the range of physical characteristics utilized by the subject control systems does not make it possible to employ the same techniques in both the pneumatic and hydraulic areas of fluid mechanics. A very fundamental difference of operation of a servo-power amplifying actuator system exists between a pneumatic and hydraulic device. As described in detail in the U.S. patent application of John A. Oelrich entitled "Time Modulated Pneumatically Actuated Control Mechanism," filed on even date herewith, the open loop natural frequency range of the complete actuator steering fin system must be considered in the selection of the carrier frequency for use with a pneumatic system. It was shown that in the preferred pneumatic system the carrier frequency selected was above the highest natural frequency of the actuator-steering fin system under consideration so that switching of the transfer valve is of the order of 270 degrees out of phase with the motion of the load. This selection of a carrier frequency above the highest system natural frequency is not the essential element of successful operation in the case of a hydraulic power amplification system, because the low compressibility of the hydraulic medium precludes this problem. In the case of the hydraulic power amplifying organization, the usual variation in aerodynamic spring rate does not effect a significant change in the system natural frequency and range. For a well designed time modulated hydraulically actuated missile guidance and control system, the system natural frequency is well above the desired operating carrier frequency. The basic difference between the pneumatic and hydraulic actuated power amplified control mechanisms stems from the fact that pressure control in a pneumatic system is achieved by time modulation, whereas flow control is achieved in the hydraulic system. The basic difference in the application of pneumatic and hydraulic power amplification to a control system can be seen from a consideration of the time modulated operation of the two modes in conjunction with a fixed volume device. As described in detail in the U.S. patent application entitled "Time Modulated Pneumatically Actuated Control Mechanism" of inventor John A. Oelrich, filed on even date herewith, the mean continuous pressure in the fixed volume can be varied by direct application of the time modulation concept described in said application. In the case of the hydraulically amplified system, however, the pressure varies almost instantaneously between supply and ambient pressure as the valve switches. The natural compliance of the load is used in the hydraulic concept to achieve the substantially non-pulsating time integrated steady-state proportional force balance that is achieved by the use of the pneumatic time constant in the case of the pneumatic concept.

The instant invention discloses an open loop control system that can achieve force or torque balance by the use of a simple non-linear servo-valve arrangement. Broadly comprehended, the time modulated control system herein disclosed comprises the concept of an open loop control system that can achieve force balance by using a simple non-linear servo-valve and simultaneously provide a hydraulically amplified force output that is proportional to the input command signal.

The instant invention obtains proportional force balance by the time modulation of a switching carrier signal applied to the servo-valve or valves of a hydraulically operated actuator. The desired effect of proportional pressure difference across the hydraulic actuator for proportional force balance is achieved by operating the servo-valve or valves such that the steady-state time integrated effect is a substantially non-pulsating continuous pressure or pressure difference whose magnitude is proportional to the degree of modulation.

For clarity of presentation, the relationship between the modulated input signal and the pressure response of the hydraulic actuator to this modulated input signal can best be illustrated by a detailed description of the operation of a proportional force balance control system utilizing the instant invention.

Figure 2:
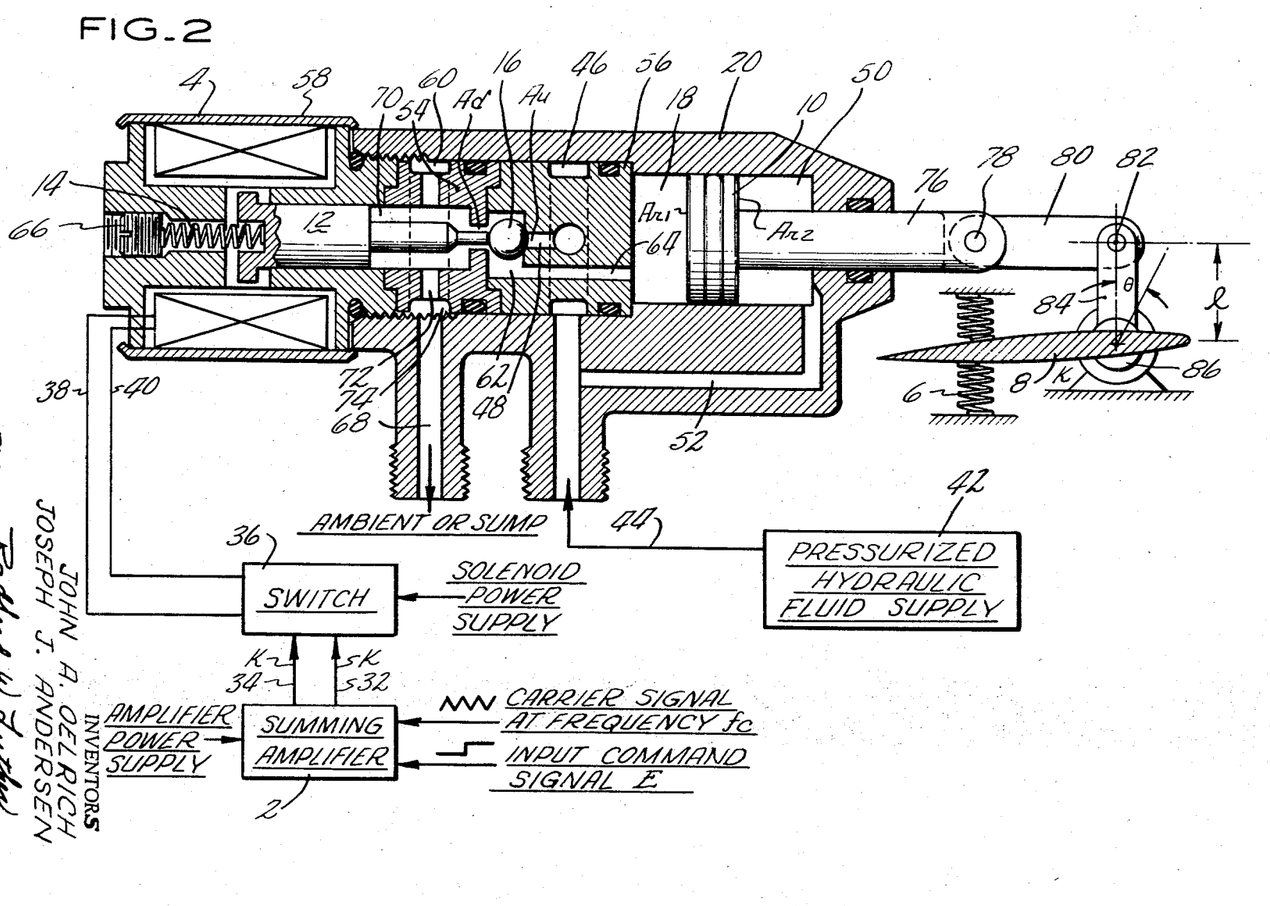
FIG. 2 is a schematic diagram, partly in cross section, of a control mechanism showing the preferred embodiment of the instant invention.

Referring now to the drawings wherein like characters are used throughout to designate like elements, and more specifically to FIG. 2 wherein is shown generally at 2 a summing amplifier, such summing amplifiers being well known in the art. A carrier signal such as the triangular wave shown by way of example is supplied to summing device 2 from a carrier signal generating device (not shown) well known in the art. The input command signal E generated by any of several types of guidance devices well known in the art is also supplied to summing device 2. By methods well known in the art, the carrier and input command signals can be summed in summing device 2 such that at a preselected single magnitude, called the threshold, the output signal K of summing device 2 will cause a solenoid valve shown generally at 4 to switch from the de-energized to the energized position.

Figures 1, 1A, 1B:
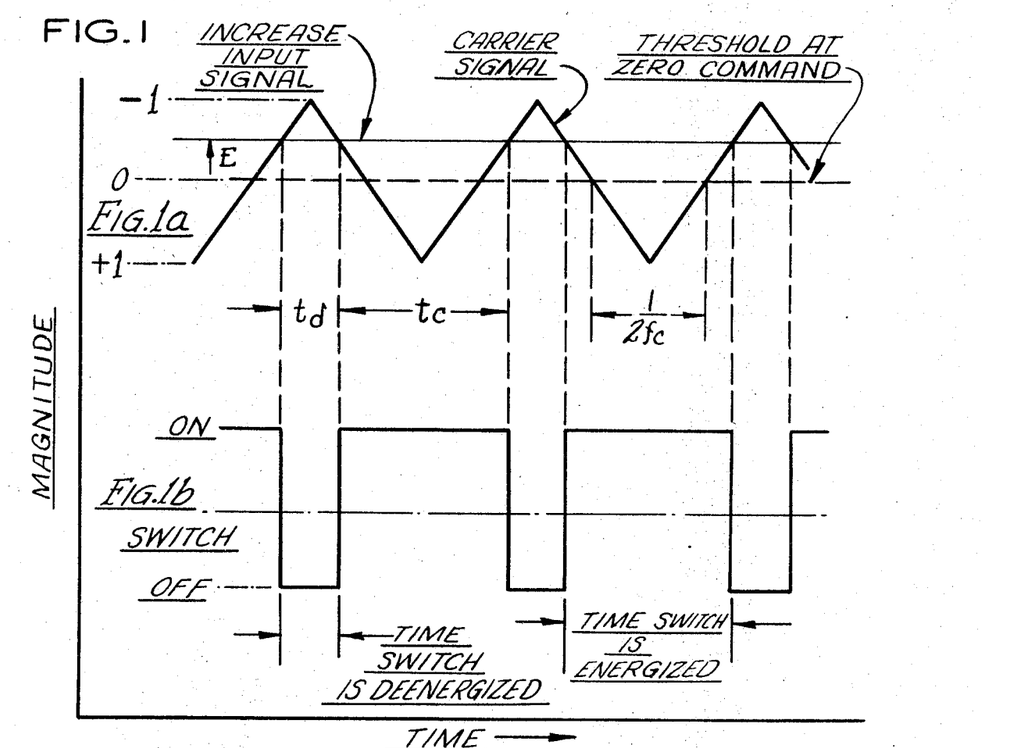
FIG. 1a and 1b are diagrams of certain operating characteristics of the power amplifying and control device shown in FIG. 2.

It can be seen from FIG. 1a that a projection of the threshold at the points of intersection with the triangular shape carrier signal will produce a square wave. A duty cycle curve wherein the solenoid is energized exactly the same amount of time that it is de-energized produces a symmetrical square wave that, by definition, establishes the null or zero command level. At commands other than zero, the solenoid will be either energized or de-energized for a longer portion of the time history, dependent upon the magnitude of the input signal E received by the summing device 2. By way of illustration, a specific input command E and a triangular carrier signal at frequency $f_c$ are shown schematically in FIG. 1a. It can be seen that by projecting the points of intersection of input command signal E (where this point represents a specific summation of carrier magnitude and magnitude of E) a specific duty cycle is produced. As shown in FIG. 1a, the time that the solenoid is energized $t_c$ is greater than the time that the solenoid is de-energized $t_d$. The effect of this modulation of the carrier frequency as shown by this illustrative example is to produce a time integrated pressure whose magnitude is greater than the zero command level.

For simplicity of presentation, the half-amplitude of the carrier signal is assumed to be of the magnitude 1 so that the input command E has the range:

$$-1 \geq E \geq 1 \quad (1)$$

As shown in the illustrative example of FIG. 1, for values of E greater than zero, the energized time $t_c$ during which liquid is charged into the actuator is increased, while the de-energized time, $t_d$ where fluid is discharged from the actuator to ambient or sump, is proportionally decreased. From FIG. 1, it can be shown that:

$$t_c = \frac{1}{2f_c}(1+E) \quad (2)$$

and, $$t_d = \frac{1}{2f_c}(1-E) \quad (3)$$

where:

E = magnitude of input command signal
$f_c$ = carrier signal frequency cycles/sec.

Referring now to FIG. 2, the springs 6 represent the aero-drynamic spring rate on the missile control surface or fin 8 associated with a given missile velocity and altitude. The analogue of "aerodynamic spring rate" is described in detail in the U.S. patent application No. 591,373 of inventor Jack O. Nash entitled "Control Mechanism," filed on Oct. 18, 1966, to which reference may be had for a detailed explanation of said "aerodynamic spring rate." Since a missile during the course of its flight is subjected to varying velocity and altitude conditions, the spring rate k will, therefore, be variable. From FIG. 2 the static torque balance equation, assuming negligible friction, for the system shown can be expressed as follows:

$$(pA_{r1} - p_sA_{r2})l = k\theta \quad (4)$$

where:

p = Modulated pressure
$p_s$ = Supply pressure
$A_{r1}$ = Piston face area
$A_{r2}$ = Piston face area
l = Length of torque area
θ = Fin angular displacement in relation to free stream vectory.

By definition, the null or zero torque output position is represented by the condition where θ=0. Further, for the purposes of this illustration, it will be assumed throughout the discussion that the ambient or sump pressure $p_b$ is negligible. To obtain the maximum bidirectional torque output of the actuator device, shown in FIG. 2, the area ratio of the differential actuator piston 10 must be 2:1. This condition expressed in equation form is as follows:

$$\frac{A_{r1}}{A_{r2}} = 2 \quad (5)$$

Substituting Equation 5 into 4, Equation 4 becomes:

$$\frac{p}{p_s} = \left(\frac{k\theta}{p_s A_{r1} l}\right) + 1/2 \quad (6)$$

It can be seen that the righthand side of Equation 6 for any given spring rate k is essentially a linear function for a reasonable range of angular deflection θ of the fin. Therefore, a continuous proportional relationship results if the pressure ratio $p/p_s$ is proportional to the input command E. This is the function which the principle of time modulation achieves using simple, non-linear state-of-the-art components.

Referring to FIG. 2, consider by way of example the condition where the input command E is zero, or by definition where the time $t_c$ equals the time $t_d$. For the ideal case, assume the time response for the electromechanical device is zero such that upon the energization of solenoid 4, plunger 12 is retracted in opposition to spring 14 permitting ball valve 16 to be urged into sealing engagement with orifice $A_d$, thus permitting the full physical inlet area $A_u$ to be available for the total charging time $t_c$, while the discharge port $A_d$ is closed. Conversely when solenoid 4 is de-energized, spring 14 urges ball valve 16 into sealing engagement with orifice $A_u$, thus closing orifice $A_u$ and opening the orifice area $A_d$ during the discharge time $t_d$. At very low values of carrier frequency $f_c$ and sufficiently large values of supply pressure, the actuator piston 10 would be fully extended during the charge cycle $t_c$, and would be fully retracted during the discharge cycle $t_d$. This mode of actuator operation is defined as bang-bang control mode of operation. It can be seen that during the charging operation the pressure in actuator chamber 18 must increase as the actuator piston 10 moves in opposition to the spring load k. Therefore, the rate at which fluid is introduced into chamber 18 must decrease. Conversely, during the discharge operation the pressure in actuator chamber 18 must decrease due to the decrease and reversal in load, thus decreasing the rate at which fluid is discharged through orifice $A_d$.

If the carrier frequency $f_c$ is continuously increased, a frequency will be reached, depending upon the physical sizing of the control system and load, where the time during which fluid is introduced into actuator chamber 18 is insufficient for a complete excursion of actuator piston 10 working in opposition to the system load. That is, the motion of actuator piston 10 will be attenuated. Similarly, the same conditions of operation will prevail during the discharge cycle because of the reduced pressures in actuator chamber 18. As the carrier frequency $f_c$ is further increased, the attenuation of the motion of actuator piston 10 will be further increased, and at a sufficiently high carrier frequency the motion of actuator piston 10 and the pressure variation in actuator chamber 18 will be reduced to an acceptable magnitude. At this point, quasi steady-state conditions about a mean pressure $p_m$ prevail.

Figure 3:
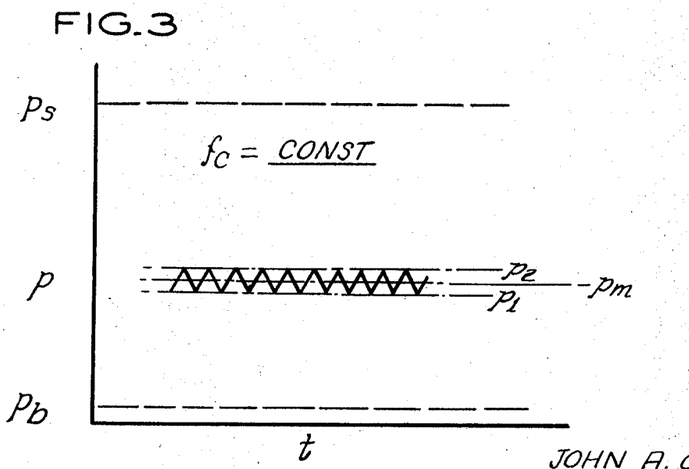
FIG. 3 is a diagram showing the quasi steady-state conditions existing about the mean hydraulic pressure.

Referring to FIG. 3, a pressure-time curve is shown wherein a triangular output wave shape having a frequency sufficiently high such that a quasi-steady-state mean pressure $p_m$ may be said to exist, with a small perturbation having a maximum $p_1$ to $p_2$ as shown. That is, as shown in FIG. 3, a substantially continuous mean pressure exists about which there is ideally a small perturbation. With the carrier signal frequency $f_c$ fixed at an acceptable value, the volume of fluid in and volume of fluid out during each cycle of the actuator shown generally at 20 in FIG. 2 may be expressed in equation forms as follows:

$$V \text{ in/cycle} = \int_0^{t_c} C A_u(t) \sqrt{p_s - p(t)} \, dt \quad (7)$$

$$V \text{ out/cycle} = \int_0^{t_d} C A_d(t) \sqrt{p(t)} \, dt \quad (8)$$

where:

V = Volume of fluid
C = Coefficient of discharge
$A_u$ = Area of inlet orifice
$A_d$ = Area of outlet orifice The valve areas and the actuator pressure are in general functions of time as indicated in Equations 7 and 8 above. For a quasi steady-state condition to exist, the volume of fluid in for an increase in actuator pressure from $p_1$ to $p_2$, as expressed in Equation 7, must equal the volume of fluid out, as expressed in Equation 8, for a similar decrease in actuator pressure from $p_2$ to $p_1$.

This continuity condition can be extended beyond the simple case of $t_c = t_d$. If $t_c$ is stepwise made greater than $t_d$, a transient condition would immediately exist, since the fluid introduced into the actuator chamber would be greater than that discharged. The result is motion of the actuator piston 10 against the spring load k, with a corresponding increase in actuator pressure. Axial motion of actuator piston 10 will proceed until the pressure in chamber 18, due to the load k, reaches a level where once again the volume of fluid in, as the pressure varies over some new range of $p_1$ to $p_2$, is just equal to the volume of fluid out as the actuator pressure decreases over the same range of pressure. From the foregoing, it can be seen that the motion of the actuator piston 10 is dependent upon the spring rate k, since equilibrium conditions are dependent on the magnitude of the actuator pressure, which in turn is dependent upon the magnitude of the spring load k. As the spring rate k is increased, axial motion of the actuator piston 10 will decrease for the same magnitude of pressure change. However, the torque output, since it is proportional only to the pressure level, will remain substantially the same.

It can be seen that for an ideal case of a step valve change and small perturbations about the mean pressure level $p_m$, Equations 7 and 8 may be rewritten as follows:

$$V \text{ in/cycle} = C A_u \sqrt{p_s - p_m} \, t_c \quad (9)$$

$$V \text{ out/cycle} = C A_d \sqrt{p_m} \, t_d \quad (10)$$

where $p_m$ is the mean pressure. Equating Equations 9 and 10 and solving for the pressure ratio $p_m/p_s$, we obtain the following equation:

$$\frac{p_m}{p_s} = \frac{1}{1 + \left(\frac{A_d t_d}{A_u t_c}\right)^2} \quad (11)$$

At the null or zero torque conditions, by definition $t_c = t_d$ for a value of $E = 0$; also, at the null or zero torque condition $\theta = 0$. Substituting the value $\theta = 0$ into Equation 6, we obtain $p/p_s = \frac{1}{2}$. Thus, it can be seen the null condition can be expressed as follows:

$$\left(\frac{p_m}{p_s}\right) \text{null} = .5 \quad (12)$$

Substituting Equation 12 into Equation 11, and simultaneously substituting the value $t_c = t_d$ into Equation 11, Equation 11 becomes:

$$\frac{A_d}{A_u} = 1.0 \quad (13)$$

From Equation 13 it can be seen that the physical valve area ratio desired for the case assumed is 1.0.

Equations 9 and 10 are the ideal volume per cycle equations of the actuator. The integrated ideal flow rate per unit of time can be obtained by multiplying each of these equations by the carrier frequency $f_c$. Multiplying Equations 9 and 10 by $f_c$ and simultaneously substituting Equations 2 and 3 into Equations 9 and 10, Equations 9 and 10 become:

$$Q_{in} = C A_u \sqrt{(p_s - p_m)} \, \frac{1 + E}{2} \quad (14)$$

$$Q_{out} = C A_d \sqrt{p_m} \, \frac{1 - E}{2} \quad (15)$$

Since continuity requires that the flow in and the flow out expressed by Equations 14 and 15 must be equal for any quasi steady-state condition, the ideal functional relationship between pressure ratio and command input E can be expressed as follows:

$$\frac{p_m}{p_s} = \frac{1}{1 + \left(\frac{A_d(1-E)}{A_u(1+E)}\right)^2} \quad (16)$$

Figure 4:
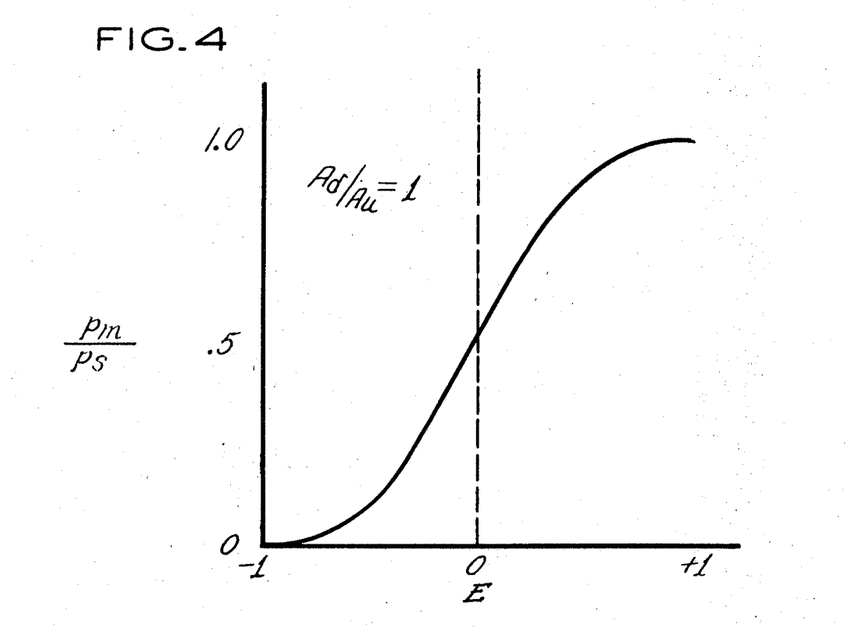
FIG. 4 is a plot of the functional relationship of the pressure ratio and command input for a valve area ratio of 1.

The relationship of the pressure ratio to input command signal for the assumed case where $A_d/A_u$ is equal to 1, is shown in FIG. 4. As shown by FIG. 4, the pressure ratio to command input proportionality is quite evident and is similar in character to that achieved by other servo-valve techniques. It can be seen that when Equation 16 is combined with Equation 6, a servo-actuation system results in which the torque produced is proportional to the input command on an open loop basis.

Figure 5:
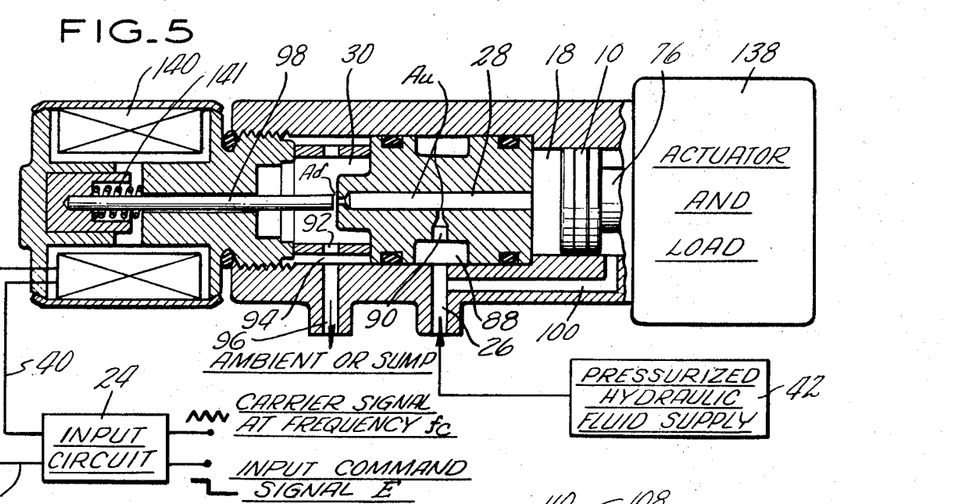
FIG. 5 is a schematic diagram, partly in cross section, of a control mechanism showing an alternate embodiment of the instant invention.

An alternate arrangement is shown in FIG. 5, wherein the solenoid operated transfer valve unit is utilized to control only the discharge orifice. With this type of control, the flow rate is greater and the pressure range is reduced. However, the valve mechanism is less complex. Referring to FIG. 5, an actuator piston 10 is shown which is operatively connected to an actuator and load mechanism described in detail in FIG. 2 herein. The valve arrangement comprises a fixed inlet orifice of area $A_u$ and a variable discharge orifice $A_d$. The maximum area of the discharge orifice is $A_d$ when the push solenoid 140 is de-energized. The area of orifice $A_d$ is zero when solenoid 140 is energized by an input signal E conducted to solenoid 140 via conduits 38 and 40 from input circuit 24. Input circuit 24 comprises the carrier signal, input command signal, summing amplifier, and switching device described in detail in FIG. 2. The charging time $t_c$ applies when $A_d = 0$ and hydraulic fluid enters actuator chamber 18 via interconnecting conduits 26 and 28. The discharging time $t_d$ refers to the condition when the discharge orifice $A_d$ is open and fluid is allowed to enter actuator chamber 18 through orifice $A_u$ and to leave conduit 28 through orifice $A_d$ into chamber 30 simultaneously. The fluid entering chamber 18 during the charged time $t_c$ can be expressed in equation form as follows:

$$V \text{ in/cycle} = \int_0^{t_c} C A_u \sqrt{p_s - p(t)} \, dt \quad (17)$$

The fluid discharged during the discharge time $t_d$ can be expressed in equation form as follows:

$$V \text{ out/cycle} = \int_0^{t_d} [CA_d(t)\sqrt{p(t)} - CA_u\sqrt{p_s - p(t)}]dt \quad (18)$$

Assuming the ideal case wherein the fluid transfer valve operates on a step function and small perturbations exist about a mean pressure $p_m$ so that $p(t)$ is equal to $p_m$, substituting $p_m = p(t)$ into Equations 17 and 18, the volume of fluid in and the volume of fluid out can be expressed as follows:

$$V \text{ in/cycle} = CA_u\sqrt{p_s - p_m} t_c \quad (19)$$

$$V \text{ out/cycle} = [CA_d\sqrt{p_m} - CA_u\sqrt{p_s - p_m}]t_d \quad (20)$$

Multiplying Equations 19 and 20 by the carrier frequency $f_c$ to obtain the integrated flow rate, and substituting Equations 2 and 3 into Equations 19 and 20, Equations 19 and 20 can be expressed as follows:

$$Q_{in} = CA_u\sqrt{p_s - p_m}\frac{1+E}{2} \quad (21)$$

$$Q_{out} = [CA_d\sqrt{p_m} - CA_u\sqrt{p_s - p_m}]\frac{1-E}{2} \quad (22)$$

At quasi steady-state conditions, continuity requires that the flow in equal the flow out. Equating Equations 21 and 22 and solving for the pressure ratio $p_m/p_s$, said pressure ratio can be expressed as follows:

$$\frac{p_m}{p_s} = \frac{1}{1 + \left(\frac{A_d}{A_u}\frac{1-E}{2}\right)^2} \quad (23)$$

Figure 6:
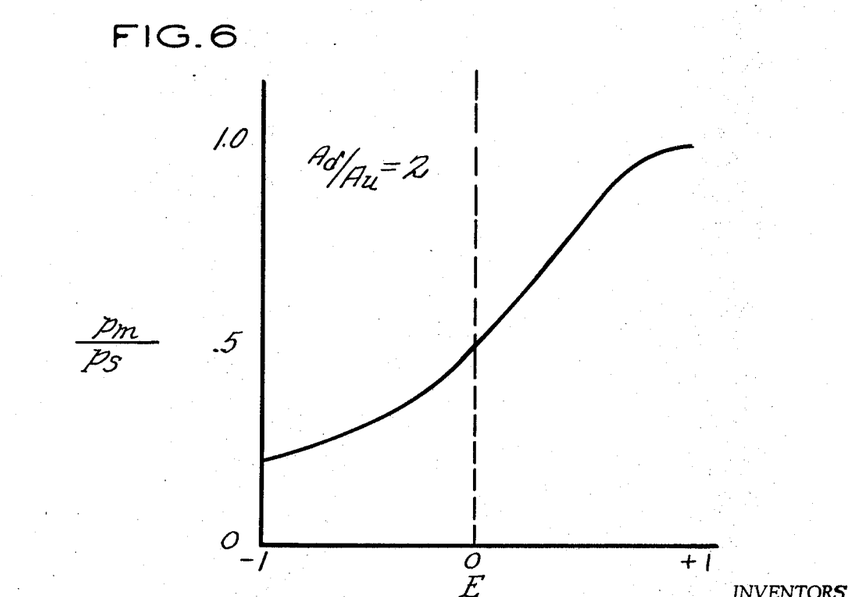
FIG. 6 is a plot of the functional relationship of the pressure ratio and command input for a valve area ratio of 2.

Inspection of Equation 23 shows that for the combination of a null pressure ratio of 0.5, as set forth in Equation 12, and an actuator differential area ratio of 2:1, a valve area ratio of $A_d/A_u$ of 2 is required. The proportionality relationship between the pressure ratio $p_m/p_s$ and the command input E for the valve area ratio of $A_d/A_u$ equals 2 is shown in FIG. 6.

OPERATION

Referring now to the drawings, said drawings being presented such that like characters are used throughout to designate like elements, and more particularly to FIG. 2, wherein is shown generally at 2 a summing amplifier. Said summing amplifier 2 receiving a carrier signal of suitable frequency $f_c$ from a signal generator (not shown) and an input command signal E from a command source (not shown), and by methods well known in the art, summing said carrier signal and said input command signal to produce a single output signal K whose instantaneous magnitude is the sum of the magnitudes of said two signals. Said output signal K is conducted via conduits 32 and 34 to electrical switch 36. Electrical switch 36 is supplied with electrical power from an appropriate power source (not shown) such that said electrical power enters electrical switch 36 and is conducted through switch 36 to solenoid 4 via conduits 38 and 40 upon receipt by electrical switch 36 of an output signal K of sufficient magnitude to actuate switch 36. The operation of electrical switch 36 is such that the switch closes upon receipt of a signal K whose magnitude is equal to or greater than the threshold level as shown in FIG. 1a, and conversely the switch 36 opens and terminates the supply of electrical power to solenoid 4 when the magnitude of the signal K drops below the threshold value. Thus, the action of switch 36 is to supply power to solenoid 4 via conduits 38 and 40 in an on-off step function mode of operation. The frequency of the power pulses received by solenoid 4 from the electrical power source through switch 36 being dependent upon the frequency $f_c$ of the carrier signal, and the duration of the pulses $t_c$ being dependent upon the modulation of the carrier signal resulting from the magnitude of the input command signal E.

The energization of solenoid 4 by the electrical power transmitted to the solenoid through switch 36 via conduits 38 and 40 causes plunger 12 to be retracted in opposition to spring 14, thereby permitting ball valve 16 to be released from sealing engagement with orifice $A_u$ and to be urged into sealing engagement with orifice $A_d$.

Pressurized hydraulic fluid is supplied to orifice $A_u$ from a source of pressurized hydraulic fluid 42 via interconnecting conduit 44, annulus 46 and conduit 48. Similarly, said pressurized hydraulic fluid is simultaneously conducted from conduit 44 to pressurized chamber 50 via interconnecting conduit 52. Valve housing 54 is mounted in a bore in piston housing 20 and is positioned in said piston housing 20 by shoulder 56. Solenoid housing 58 is positioned in bore 60 of piston housing 20 and threadably engages piston housing 20 such that valve housing 54 and solenoid housing 58 are secured in a fixed relation to piston housing 20 by means of shoulder 56 and the threaded engagement of solenoid housing 58 into bore 60 of housing 20. When solenoid 4 is energized by means of an appropriate signal from switch 36, plunger 12 is retracted compressing spring 14. Upon the retraction of plunger 12, ball valve 16 is urged from sealing engagement with orifice $A_u$ into sealing engagement with orifice $A_d$ by means of the constant hydraulic pressure present in conduit 48 in fluid communication with orifice $A_u$. The retraction of ball valve 16 permits fluid to flow through orifice $A_u$ and thence through interconnecting passageways 62 and 64 into chamber 18. Conversely, when solenoid 4 is de-energized, spring 14, retained by adjustable cap 66 secured to solenoid housing 58, urges plunger 12 into engagement with ball 16, causing ball 16 to sealably engage orifice $A_u$; while simultaneously connecting chamber 18 to ambient exhaust port 68 via interconnecting conduits 70, 72 and 74.

By way of example, with the area $A_{r2}$ of actuator piston 10 one-half the area $A_{r1}$, and with the ratio of exhaust area orifice $A_d$ to inlet area orifice $A_u$ fixed at 1.0, and the dynamic movement of ball 16 between sealing engagement with orifice $A_u$ and $A_d$ such as to establish the quasi steady-state condition described in detail herein, the magnitude of the pressure in chamber 18 will be $.5\ p_s$ at zero command signal.

Further, when the area $A_{r2}$ of piston 10 shown in FIG. 2 subjected to constant pressure $p_s$ via interconnecting passageways 52 and 54 is one-half the area $A_{r1}$ of said piston 10 subjected to the modulated quasi steady-state pressure of chamber 18; and a pressure whose magnitude is exactly $.5\ p_s$ is impressed on area $A_{r1}$ of piston 10, output piston 28 remains stationary, and a so-called null condition exists.

The modulation of the carrier signal by the input command signal E can result in a modulated pressure in chamber 18 having a magnitude either greater or less than $.5\ p_s$. If the modulated pressure in chamber 18 is less than $.5\ p_s$, output piston 10 and integrally connected piston rod 76 moves axially to the left. Conversely, if the modulated pressure in chamber 18 is greater than $.5\ p_s$, axial motion to the right of said piston 10 and said piston rod 76 results. Bidirectional axial motion of piston 10 and piston rod 76 causes a corresponding bidirectional force to be transmitted along the axis of rod 76 through journal pin 78 to intermediate link 80. One end of link 80 is rotatively connected to rod 76 by pin 78, and the other end of link 80 is rotatively connected to arm 84 by means of pin 82. The rotative movement of control surface 8 is accomplished by the translation of the axial motion of pin 78 into rotative movement of arm 84 by means of the kinematic of link 80, pin 82 and bell crank arm 84. The rotative movement of arm 84 is transmitted to aerodynamic control surface 8 via shaft 86 fixedly secured to both arm 84 and control surface 8. The aerodynamic force of control surface 8 is symbolically represented in FIG. 2 by spring 6, said spring 6 indicating a variable spring rate representative of the variable aerodynamic forces present on fin 8 during the course of a flight operation. The aerodynamic force symbolically represented by spring 6 is opposed by the force generated by actuator piston 10 and transmitted to control surface 8 via interconnected elements 76, 78, 80, 82, 84 and 86.

FIG. 5 shows an alternate adaptation of the time modulated hydraulically actuated control embodiment wherein a fixed inlet orifice and a variable discharge orifice are utilized.

Referring now to FIG. 5 wherein is shown generally at 24 an input circuit comprising a carrier signal, an input command signal E, summing amplifier 2 and switching device 36, similar to that shown in detail in FIG. 2, and whose operation is the same as that described in detail herein for the like organization shown in FIG. 2. Similarly, the actuator and load shown generally at 138 comprises a conventional half area actuator piston 10, piston rod 76 and interconnecting link 80, bell crank 84, aerodynamic fin 8 opposed by an aerodynamic load represented symbolically by spring 6 precisely as described in detail herein for FIG. 2. Pressurized hydraulic fluid is conducted from a suitable source 42 to conduit 26 and thence via interconnected anulus 88, and passageway 90 to fixed orifice $A_u$. Said pressurized fluid is allowed to enter actuator chamber 18 through fixed orifice $A_u$ via passageway 28 and to simultaneously be discharged through variable orifice $A_d$ via interconnected passageways 30, 92, 94 and 96 to atmosphere or sump. Push solenoid 140 is actuated by an electrical power signal transmitted thereto via conduits 38 and 40 from input circuit 24. When solenoid 140 is energized, plunger 98 moves into sealing engagement with variable orifce $A_d$, thereby restricting the flow of pressurized hydraulic fluid through passageway 28, causing the magnitude of the quasi steady-state time modulated pressure in chamber 18 to rise and thereby urge piston 10 to move axially to the right. Conversely, when solenoid 140 is de-energized, plunger 98 is urged from sealing engagement with variable orifice $A_d$ by spring 141, and pressurized fluid is permitted to pass to atmosphere or sump via interconnected passageways 28, 30, 92, 94 and 96. This action reduces the magnitude of the quasi steady-state time modulated pressure in chamber 18 and permits the constant supply pressure $p_s$ conducted to chamber 50 via interconnecting passageways 26 and 100 to axially move piston 10 to the left. The bidirectional axial movement of piston 10 produces an operative movement of actuator linkage mechanism in opposition to the aerodynamic load similar to that described in detail in FIG. 2.

Figure 7:
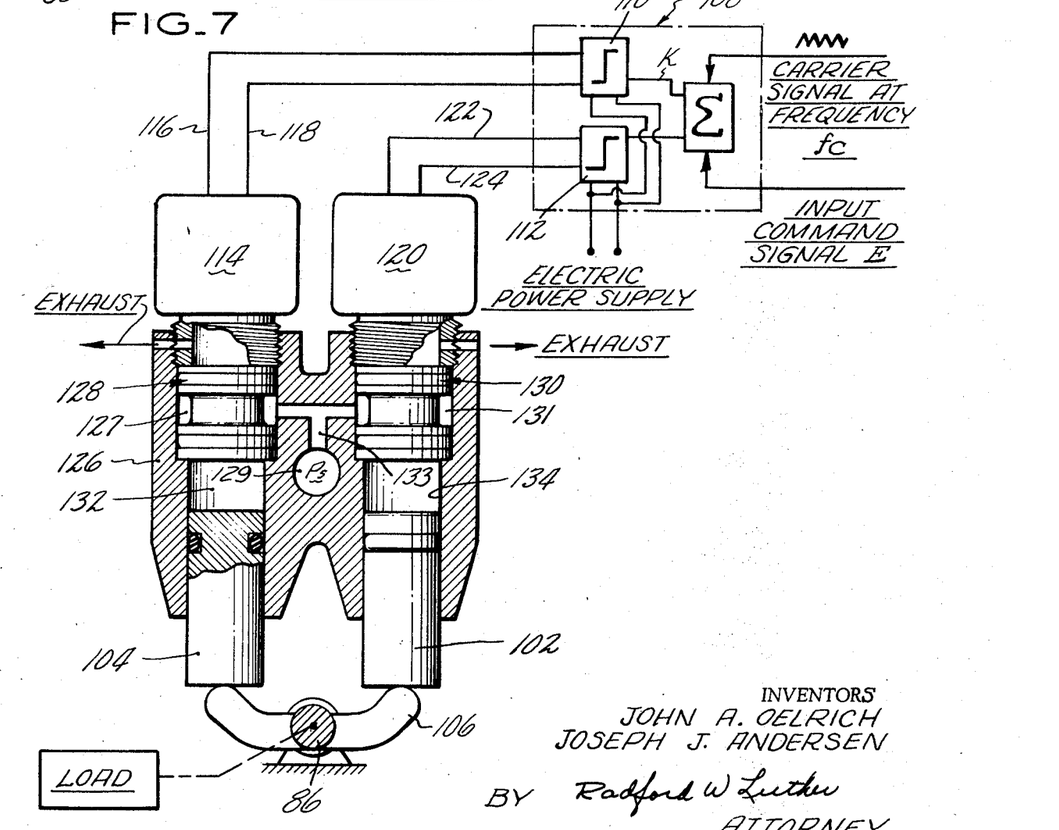
FIG. 7 is a schematic diagram, partly in cross section, of a control mechanism showing a second alternate embodiment of the instant invention.

A second alternate arrangement, shown in FIG. 7, utilizes two actuator assemblies each having a single actuator piston 102 and 104 respectively with the axes of the respective actuator pistons parallel to each other and so arranged as to engage the opposite ends of a center mounted torque arm 106. Shaft 86 positioned intermediate torque arm 106 and an aerodynamic control surface (not shown) is fixedly connected to both torque arm 106 and said control surface. The aerodynamic control surface and the resulting aerodynamic load arrangement are similar to that shown in detail in FIG. 2. The input circuit shown generally at 108 is similar to the summing amplifier and switching arrangement described in detail for FIG. 2 herein. However, two electrical switches 110 and 112 each similar in operation to switch 36 described in FIG. 2 are used. Electrical switches 110 and 112 differ from each other in operation in that one switch is energized at an output signal K whose magnitude is greater than the norm or threshold value, while the other switch 112 is de-energized when an output signal K of similar magnitude is imposed thereon. Switch 110 energizes solenoid 114 via conduits 116 and 118, and switch 112 energizes solenoid 120 via conduits 122 and 124. Solenoids 114 and 120 are threadably secured to housing 126 and operatively engage valve assemblies 128 and 130 respectively. Valves 128 and 130 can be liquid transfer mechanisms of either the two fixed orifices in series or the fixed inlet orifice and variable discharge orifice arrangements, both of which are described in detail in FIGS. 2 and 5 herein respectively.

The opposite ends of rocker arm 106 each engage one end of separate actuator pistons 102 and 104 of the respective juxtaposed actuator assemblies. The other end of each of said actuator pistons 102 and 104 has an equal area exposed to pressurized liquid conducted to chambers 132 and 134 via valve assemblies 128 and 130 respectively. Pressurized liquid is simultaneously supplied to assemblies 128 and 130 from a source of pressurized liquid 129 via interconnected passageways 127, 131 and 133. Valve assemblies 128 and 130 are so constructed that pressurized liquid is conducted to only one end of pistons 104 and 102 respectively. Thus, when time modulated quasi steady-state pressure of equal magnitude is exerted on both pistons, each piston produces a force which is transmitted to a respective point of engagement with its half of torque arm 106 such that there is an equal but opposite torque produced by torque arm 106. This equal but opposite torque condition produces an equilibrium or null condition about the rotative axis of actuator shaft 86. Time modulated liquid transfer mechanisms 128 and 130 of either the embodiment shown in FIG. 2 or that shown in FIG. 5 can be utilized to supply a time modulated pressure to chambers 132 and 134 respectively. Either the liquid transfer mechanism shown in FIG. 2 or FIG. 5 is so constructed that when utilized in conjunction with the opposed two switch input circuit the pressure in chamber 132 will increase, while that in chamber 134 will decrease; and conversely, the pressure in chamber 132 will decrease, while that in chamber 139 will increase when the input signal to the solenoids 114 and 120 is reversed. Thus, for a variation in input control signal E, the force output of the two pistons varies from a zero or null level to produce either an increased or decreased force proportional to the input signal E such that clockwise or counterclockwise rotation of actuation shaft 86 is produced dependent upon the magnitude of the input command signal with respect to the null or zero command level.

What I claim is:

1. An open loop control mechanism comprising, an electrical input command signal, a varying electrical carrier signal, means for combining said input signal and said carrier signal to generate at least one intermittent modulated electrical output signal having a time integrated magnitude proportional to the magnitude of said input signal, a source of incompressible pressurized fluid, actuator means connected to a control surface to form a control unit having a compliant reactive characteristic, means for receiving said output signal, and pressurized fluid receiving and controlling means responsive to signals received by said output signal receiving means to control the flow of said pressurized fluid to said actuator means to produce a force upon said control surface proportional to the magnitude of said electrical input signal irrespective of control surface position whereby a substantially non-pulsating pressure is applied to said actuator means.

2. The apparatus of claim 1 wherein said pressurized fluid receiving and controlling means comprises a solenoid operated valve having a valve element, an inlet, an outlet and a chamber communicating with said inlet and said outlet with said source of incompressible pressurized fluid connected to said inlet, and having said modulated output signal applied to said solenoid to alternately position said valve element in engagement with said inlet and said outlet thereby controlling the flow of said pressurized fluid from said chamber to said actuator means.

3. The apparatus of claim 1 whereby said pressurized fluid receiving and controlling means comprises a fixed inlet orifice, a chamber and an outlet passage in series flow relationship, with said chamber fluidly connected to said actuator means, a solenoid operated member mounted adjacent said outlet passage, a solenoid receiving said intermittent modulated output signal and alternately positioning said member in a decreasing and increasing fluid flow relationship with said outlet passage responsive to said output signal thereby controlling the flow of said pressurized incompressible fluid to said actuator means.

4. The apparatus of claim 1 wherein said actuator means comprises a rocker arm pivotably mounted intermediate the ends thereof and a first and a second piston, one end of said first piston operatively engaging one end of said rocker arm and one end of said second piston engaging the opposite end of said rocker arm, said pressurized fluid receiving and controlling means comprises a first chamber in fluid communication with the opposite end of said first piston and a second chamber in fluid communication with the opposite end of said second piston, said means for combining said input signal and said carrier signal comprising a pair of signal conditioning means constructed and arranged to receive said input signal and said carrier signal and generate a first and a second output signal, first and second solenoid operated fluid transfer means in fluid communication with said first and said second chambers respectively, said first output signal conducted to said first solenoid operated fluid transfer means and said second output signal conducted to said second solenoid operated fluid transfer means thereby controlling the flow of fluid from said first and said second chambers to said first and said second pistons such that the pressure in one of said chambers will increase while the pressure in the other of said chambers will decrease to thereby produce a rotative motion of said rocker arm about a rocker arm pivot.

5. A control mechanism including a pressure responsive actuator secured to a control element having a compliant reactive characteristic, a source of pressured incompressible fluid, means adapted to receive an input command signal and a varying carrier signal to generate at least one pulsed output signal, fluid transfer means communicating said fluid to said actuator to direct a substantially non-pulsating pressure to said actuator having a value proportional to the value of said input signal irrespective of control element position; said fluid transfer means comprising at least one chamber in fluid communication with said actuator receiving said pressurized fluid, and means responsive to said output signal to control the flow of fluid through said chamber to produce said substantially non-pulsating pressure.

6. The control mechanism of claim 5 wherein the fluid transfer means comprises a solenoid operated valve, an inlet positioned in fluid communication with said chamber and receiving said source of pressurized fluid, an outlet in fluid communication with said chamber and discharging pressurized fluid therefrom, a valve element intermediate said inlet and said outlet being alternately positioned by a solenoid in engagement with said inlet and said outlet in response to said output signal received by said solenoid to thereby control the flow of pressurized fluid to said actuator such that a substantially non-pulsating pressure is formed in said actuator, each finite value of said pressure being proportional to a corresponding finite value of said input signal.

7. The control mechanism of claim 5 wherein said fluid transfer means comprises an inlet orifice in fluid communication with said chamber and receiving said pressurized fluid, an outlet passage in fluid communication with said chamber and discharging fluid from said chamber, a solenoid operated member mounted adjacent said outlet passage, a solenoid adapted to alternately position said member to open and close said outlet responsive to said output signal received by said solenoid and thereby control the flow of fluid from said chamber to said actuator to produce a substantially non-pulsating pressure in said actuator, each finite value of said pressure in said actuator being proportional to a corresponding finite value of input signal.

8. A control mechanism as claimed in claim 5 wherein said pressure responsive actuator comprises an arm pivotably mounted intermediate the ends thereof, a first and a second piston, the respective ends of said arm operatively engaging one end of said first and said second pistons respectively, separate chambers in fluid communication with the other end of each of said first and said second pistons respectively, said means adapted to receive said input command signal and said carrier signal constructed and arranged to simultaneously receive said input signal and said carrier signal and direct separate output signals to separate solenoid operated fluid transfer means in fluid communication respectively with said first and said second chambers such that said separate solenoid operated fluid transfer means responsive to said separate output signals control the flow of fluid to said first and said second chambers thereby generating a pressure in one chamber that will decrease while the pressure in the other chamber increases to produce rotative movement of said arm about a pivot.

9. Apparatus for transforming a varying electrical input signal into a proportional force output signal at an increased energy level comprising, in combination, a source of pressurized incompressible fluid, force amplifying actuator means having compliant control surfaces secured thereto, said actuator means connected to said control surfaces to form a control unit having a compliant reactive characteristic, a varying electrical carrier signal source, signal conditioning means receiving said electrical input signal and said carrier signal to combine said signals into a modulated intermittent electrical output signal, fluid transfer means having an inlet, a chamber and an outlet in series flow relationship, said source of pressurized fluid communicating with said fluid transfer means, said fluid transfer means comprising means responsive to said output signal to produce an actuator means force output proportional to said electrical input signal irrespective of the control surfaces position, means connecting said fluid transfer means to said actuator means to permit a controlled fluid flow to said actuator means and generation of a substantially non-pulsating pressure in said actuator means and in said chamber whereby the coaction of said controlled fluid flow and said compliant control unit permits the establishment of said substantially non-pulsating pressure and the generation of said proportional force output by the means responsive to said output signal.

10. In combination with a flight vehicle having a guidance system including a guidance system output signal and compliant control surfaces associated therewith for respectively sensing the value of and producing an output signal proportional to the flight path deviation and for steering the flight vehicle, a control mechanism comprising, a source of pressurized hydraulic fluid, a varying carrier signal source, pressure responsive actuator means connected to said control surfaces to form an actuator unit having a compliant response, modulating means receiving said guidance system signal and said varying carrier signal for generating a modulated intermittent output signal having a time integrated magnitude proportional to the magnitude of said guidance system output signal, fluid transfer means connected to said source of pressurized fluid and controlling the flow of said fluid from said transfer means responsive to said modulated output signal, said fluid transfer means fluidly connected to said actuator unit such that said controlled fluid flow coacts with said compliant actuator unit, said fluid transfer means comprising means generating an actuator force, irrespective of control surface position, each finite value of which is proportional to a corresponding finite value of said guidance system output signal by producing a substantially non-pulsating pressure in said actuator.

References Cited

UNITED STATES PATENTS 3,131,340   4/1964   Johnson et al. _____ 318—20.480
3,260,912   7/1966   Gregory _________ 318—20.480

PAUL E. MASLOUSKY, Primary Examiner

U.S. Cl. X.R.

91—186, 417, 459; 92—131; 244—78; 318—18